(12) United States Patent
Bantz et al.

(10) Patent No.: US 7,174,017 B2
(45) Date of Patent: Feb. 6, 2007

(54) DECRYPTION SYSTEM FOR ENCRYPTED AUDIO

(75) Inventors: David F. Bantz, Chappaqua, NY (US); Thomas E. Chefalas, Somers, NY (US); Alexei A. Karve, Mohegan Lake, NY (US); Steven J. Mastrianni, Unionville, CT (US); Ajay Mohindra, Yorktown Heights, NY (US)

(73) Assignee: Lenovo Singapore Pte, Ltd, Singapore (SG)

( * ) Notice: Subject to any disclaimer, the term of this patent is extended or adjusted under 35 U.S.C. 154(b) by 687 days.

(21) Appl. No.: 10/091,206

(22) Filed: Mar. 4, 2002

(65) Prior Publication Data

US 2003/0165239 A1   Sep. 4, 2003

(51) Int. Cl.
*H04K 1/00* (2006.01)
*G06F 9/00* (2006.01)
(52) U.S. Cl. .................. 380/255; 380/277; 380/278
(58) Field of Classification Search ................. 380/255
See application file for complete search history.

(56) References Cited

U.S. PATENT DOCUMENTS

| | | | | |
|---|---|---|---|---|
| 4,440,976 A | * | 4/1984 | Bocci et al. ................ | 380/277 |
| 4,575,621 A | * | 3/1986 | Dreifus ....................... | 235/380 |
| 4,744,080 A | * | 5/1988 | Brennand et al. .......... | 380/212 |
| 4,821,097 A | * | 4/1989 | Robbins ...................... | 348/485 |
| 4,890,321 A | * | 12/1989 | Seth-Smith et al. ........ | 380/231 |
| 4,903,298 A | * | 2/1990 | Cline .......................... | 380/270 |
| 4,914,697 A | * | 4/1990 | Dabbish et al. ............. | 380/28 |
| 5,120,939 A | * | 6/1992 | Claus et al. ................ | 235/382 |
| 5,204,961 A | * | 4/1993 | Barlow ....................... | 713/201 |
| 5,267,312 A | * | 11/1993 | Thompson et al. ......... | 380/237 |
| 5,305,384 A | * | 4/1994 | Ashby et al. ................ | 380/29 |
| 5,369,706 A | * | 11/1994 | Latka ......................... | 380/262 |
| 5,377,270 A | * | 12/1994 | Koopman, Jr. et al. ..... | 380/262 |
| 5,400,403 A | * | 3/1995 | Fahn et al. .................. | 705/51 |
| 5,499,298 A | * | 3/1996 | Narasimhalu et al. ....... | 705/54 |
| 5,524,051 A | * | 6/1996 | Ryan .......................... | 380/237 |
| 5,544,161 A | * | 8/1996 | Bigham et al. ............. | 370/397 |
| 5,598,476 A | * | 1/1997 | LaBarre et al. ............. | 713/171 |
| 5,604,801 A | * | 2/1997 | Dolan et al. ................. | 713/159 |
| 5,787,180 A | * | 7/1998 | Hall et al. .................... | 380/52 |
| 5,845,068 A | * | 12/1998 | Winiger ....................... | 713/200 |
| 5,903,704 A | * | 5/1999 | Owashi et al. ............... | 386/95 |
| 5,915,025 A | * | 6/1999 | Taguchi et al. .............. | 380/44 |
| 5,933,090 A | * | 8/1999 | Christenson ........... | 340/825.69 |

(Continued)

FOREIGN PATENT DOCUMENTS

EP      1161064 A2 *  12/2001

*Primary Examiner*—Gilberto Barron
*Assistant Examiner*—David Garcia Cervetti
(74) *Attorney, Agent, or Firm*—Harrington & Smith LLP; Carlos Munoz-Bustamante

(57) ABSTRACT

An encrypted audio decryption system for decrypting encrypted audio sound. The system includes a hearing device and a key FOB. The hearing device is adapted to receive the encrypted audio sound, decrypt the encrypted audio sound, and transmit signals corresponding to the decrypted audio sound to a speaker of the hearing device. The key FOB is adapted to transmit a decryption key to the hearing device. The hearing device is adapted not to decrypt the encrypted audio sound without receipt of the decryption key, corresponding to the encrypted audio sound, from the key FOB.

17 Claims, 4 Drawing Sheets

U.S. PATENT DOCUMENTS

| | | | | |
|---|---|---|---|---|
| 5,937,065 A * | 8/1999 | Simon et al. | | 380/262 |
| 5,952,937 A * | 9/1999 | Koopman et al. | | 340/825.72 |
| 5,970,149 A * | 10/1999 | Johnson | | 714/46 |
| 6,021,203 A * | 2/2000 | Douceur et al. | | 380/252 |
| 6,034,617 A * | 3/2000 | Luebke et al. | | 340/5.62 |
| 6,035,398 A * | 3/2000 | Bjorn | | 713/186 |
| 6,038,666 A * | 3/2000 | Hsu et al. | | 713/186 |
| 6,041,410 A * | 3/2000 | Hsu et al. | | 713/186 |
| RE36,752 E * | 6/2000 | Koopman, Jr. et al. | | 380/262 |
| 6,078,888 A * | 6/2000 | Johnson, Jr. | | 705/1 |
| 6,081,893 A * | 6/2000 | Grawrock et al. | | 713/183 |
| 6,112,103 A * | 8/2000 | Puthuff | | 455/557 |
| 6,134,660 A * | 10/2000 | Boneh et al. | | 713/193 |
| 6,157,722 A * | 12/2000 | Lerner et al. | | 380/260 |
| 6,185,307 B1 * | 2/2001 | Johnson, Jr. | | 380/270 |
| 6,194,991 B1 * | 2/2001 | Barrs et al. | | 340/5.72 |
| 6,236,333 B1 * | 5/2001 | King | | 340/5.61 |
| 6,236,727 B1 * | 5/2001 | Ciacelli et al. | | 380/212 |
| 6,266,418 B1 * | 7/2001 | Carter et al. | | 380/257 |
| 6,273,359 B1 * | 8/2001 | Newman et al. | | 242/595 |
| 6,307,940 B1 * | 10/2001 | Yamamoto et al. | | 380/277 |
| 6,314,190 B1 * | 11/2001 | Zimmermann | | 380/282 |
| 6,323,566 B1 * | 11/2001 | Meier | | 307/10.2 |
| 6,377,173 B1 * | 4/2002 | Desai | | 340/426.36 |
| 6,393,565 B1 * | 5/2002 | Lockhart et al. | | 713/172 |
| 6,408,390 B1 * | 6/2002 | Saito | | 713/193 |
| 6,438,694 B2 * | 8/2002 | Saito | | 713/189 |
| 6,510,182 B1 * | 1/2003 | Lee et al. | | 375/259 |
| 6,510,515 B1 * | 1/2003 | Raith | | 713/163 |
| 6,590,981 B2 * | 7/2003 | Fruehauf et al. | | 380/260 |
| 6,603,388 B1 * | 8/2003 | Perraud et al. | | 340/5.61 |
| 6,617,961 B1 * | 9/2003 | Janssen et al. | | 340/5.8 |
| 6,647,496 B1 * | 11/2003 | Tagawa et al. | | 713/193 |
| 6,668,204 B2 * | 12/2003 | Neoh | | 700/94 |
| 6,728,585 B2 * | 4/2004 | Neoh | | 700/94 |
| 6,741,659 B1 * | 5/2004 | Chan et al. | | 375/295 |
| 6,748,485 B1 * | 6/2004 | Yokota et al. | | 711/112 |
| 6,748,536 B1 * | 6/2004 | Madau | | 713/193 |
| 6,782,102 B2 * | 8/2004 | Blanchard et al. | | 380/270 |
| 6,850,252 B1 * | 2/2005 | Hoffberg | | 715/716 |
| 6,859,535 B1 * | 2/2005 | Tatebayashi et al. | | 380/201 |
| 6,865,431 B1 * | 3/2005 | Hirota et al. | | 700/94 |
| 6,938,169 B1 * | 8/2005 | Caronni et al. | | 383/33 |
| 2001/0038328 A1 * | 11/2001 | King et al. | | 340/5.64 |
| 2002/0010679 A1 * | 1/2002 | Felsher | | 705/51 |
| 2002/0027994 A1 * | 3/2002 | Katayama et al. | | 380/269 |
| 2002/0031139 A1 * | 3/2002 | Yoshizawa | | 370/419 |
| 2002/0040254 A1 * | 4/2002 | Neoh | | 700/94 |
| 2002/0040255 A1 * | 4/2002 | Neoh | | 700/94 |
| 2002/0040434 A1 * | 4/2002 | Elliston et al. | | 713/186 |
| 2002/0057795 A1 * | 5/2002 | Spurgat et al. | | 380/1 |
| 2002/0109580 A1 * | 8/2002 | Shreve et al. | | 340/5.61 |
| 2002/0110242 A1 * | 8/2002 | Bruwer | | 380/255 |
| 2002/0147927 A1 * | 10/2002 | Tait | | 713/201 |
| 2002/0178364 A1 * | 11/2002 | Weiss | | 713/182 |
| 2003/0007640 A1 * | 1/2003 | Harada et al. | | 380/270 |
| 2003/0007643 A1 * | 1/2003 | Ben-Zur et al. | | 380/277 |
| 2003/0034877 A1 * | 2/2003 | Miller et al. | | 340/5.61 |
| 2003/0040344 A1 * | 2/2003 | Shteyn et al. | | 455/573 |
| 2003/0069848 A1 * | 4/2003 | Larson et al. | | 705/50 |
| 2003/0073460 A1 * | 4/2003 | van Pelt et al. | | 455/556 |
| 2003/0093693 A1 * | 5/2003 | Blight et al. | | 713/201 |
| 2003/0105964 A1 * | 6/2003 | Brainard et al. | | 713/178 |
| 2003/0142960 A1 * | 7/2003 | Yokota et al. | | 386/94 |
| 2003/0149666 A1 * | 8/2003 | Davies | | 705/50 |
| 2004/0076294 A1 * | 4/2004 | Shibata et al. | | 380/201 |
| 2004/0123321 A1 * | 6/2004 | Striemer | | 725/62 |

* cited by examiner

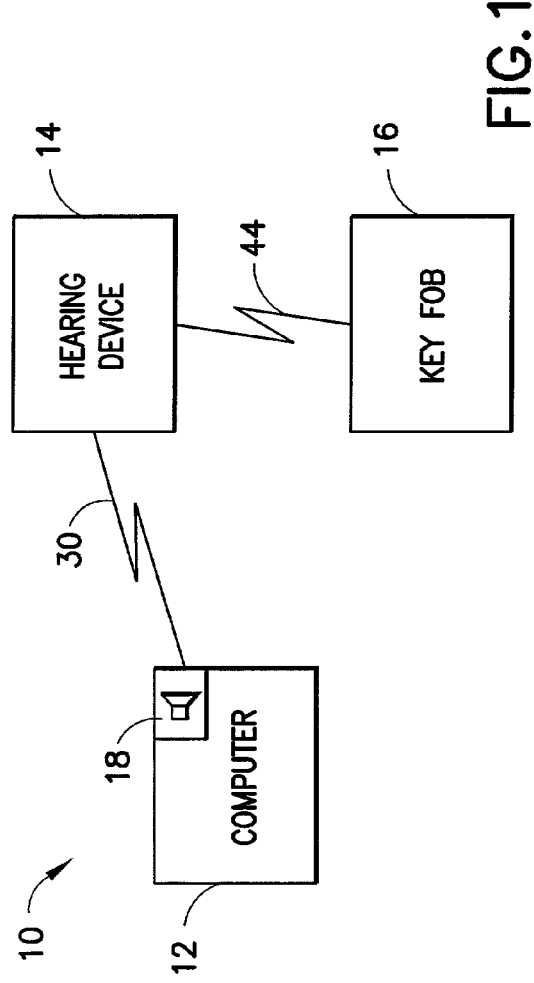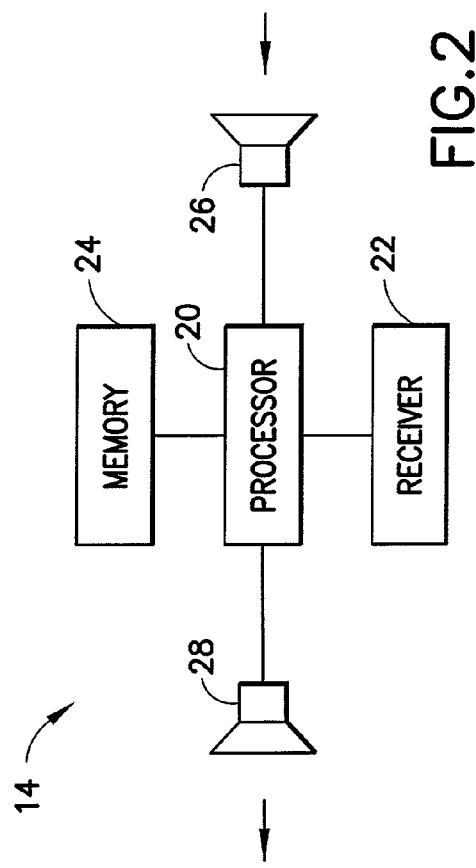

DECRYPTION SYSTEM FOR ENCRYPTED AUDIO

BACKGROUND OF THE INVENTION

1. Field of the Invention

The present invention relates to methods and apparatus to provide for the encryption and decryption of audio generated by a computer or computer sound system.

2. Description of Related Art

Current technology in secure listening devices utilizes digital keys, scramblers and descramblers, and various encryption methods to encrypt and decrypt data (analog or digital) from telephones or other listening devices. Companies and governments sometimes have the need to have certain sounds emanating from a computer system to be heard by a select person or group of persons while not being heard by others in the same proximity. There is a need for system which can decrypt an encrypted audio transmission for a select person or group of persons with all others hearing nothing or gibberish.

SUMMARY OF THE INVENTION

In accordance with one aspect of the present invention, an encrypted audio decryption system for decrypting encrypted audio sound is provided. The system includes a hearing device and a key FOB. The hearing device is adapted to receive the encrypted audio sound, decrypt the encrypted audio sound, and transmit signals corresponding to the decrypted audio sound to a speaker of the hearing device. The key FOB is adapted to transmit a decryption key to the hearing device. The hearing device is adapted not to decrypt the encrypted audio sound without receipt of the decryption key, corresponding to the encrypted audio sound, from the key FOB.

In accordance with another aspect of the present invention, an audio hearing device is provided comprising a microphone; a system for decrypting encrypted audio sounds received at the microphone; and a speaker adapted to be placed at a user's ear. The speaker is connected to the decrypting system for transmitting decrypting audio sounds from the speaker to a user's ear. The decrypting system comprises a memory and a system for receiving and temporarily storing a decryption key in the memory. The decrypting system requires a predetermined decryption key in the memory in order for the decrypting system to decrypt the encrypted audio sounds.

In accordance with one method of the present invention, a method for decrypting encrypted audio sounds is provided comprising steps of receiving the encrypted audio sounds at a hearing device having a speaker at an ear of a user; receiving a decryption key by the hearing device; and decrypting the encrypted audio sounds by the hearing device if the decryption key matches a predetermined decryption key for the encrypted audio sounds.

BRIEF DESCRIPTION OF THE DRAWINGS

The foregoing aspects and other features of the present invention are explained in the following description, taken in connection with the accompanying drawings, wherein:

FIG. 1 is a block diagram showing a system incorporating features of the present invention;

FIG. 2 is a schematic diagram of components of the hearing device shown in FIG. 1;

DETAILED DESCRIPTION OF THE PREFERRED EMBODIMENTS

Figure 3:
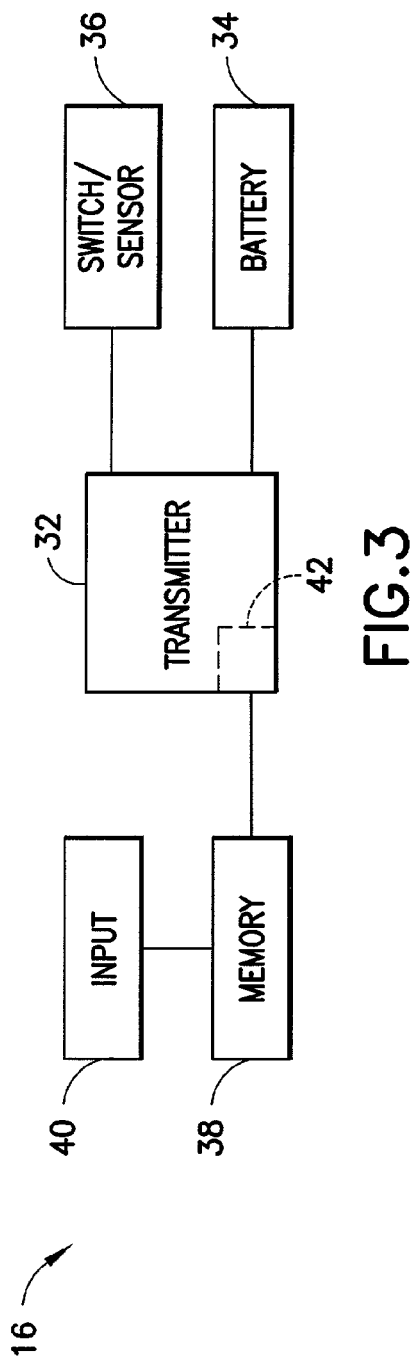
FIG. 3 is a schematic diagram of components of the key FOB shown in FIG. 1.

The present invention relates to methods and apparatus to provide for the encryption and decryption of sound emanating from a computer system using a private key mechanism. Referring to FIG. 1, there is shown a block diagram of a system 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The system 10, in the embodiment shown, generally comprises a computer 12, a hearing device 14, and a key FOB 16. The computer 12 generally comprises a speaker 18. The computer 12 could be any suitable type of computer, such as a desktop computer, a laptop computer, or a client computer connected to a network server. In an alternate embodiment of the present invention, the computer 12 could be any suitable type of electronic device comprising a speaker. In the preferred embodiment shown, the computer 12 generally comprises a processor, a keyboard, a display, a hard drive, and a memory. In an alternate embodiment, the computer could comprise additional or alternative components. The computer 12 could be a conventional computer, or could comprise a conventional computer with additional components or software as understood from the description below.

The computer 12 is adapted to broadcast sound from the speaker 18. The sound emanating from the speaker 18 can comprise ordinary audio sound, such as a voice, encrypted audio sound, or a combination of ordinary audio sound and encrypted audio sound. Encrypted audio sound comprises sound waves which include voice sounds that have been encrypted such that the voice sounds will not be heard in a comprehensible fashion by an ordinary person without the hearing device 14. The sounds emanating from the speaker 18 are preferably transmitted or broadcast through the air as indicated by arrow 30. In an alternate embodiment, the sounds might be transmitted to the hearing device 14 by an electrical cable, and the speaker 18 might not be provided. If sounds emanating from the speaker 18 are audible to a human ear, then the volume of the speaker 18 is preferably low and the hearing device 14 can comprise an amplifier.

The hearing device 14 is preferably a device adapted to be placed adjacent or in a user's ear, such as a headphone set or a hearing aid type of device. Referring also to FIG. 2, the hearing device 14 generally comprises a processor 20, a receiver 22, a memory 24, a microphone 26, and an acoustic transducer or speaker 28. In an alternate embodiment, the hearing device could comprise additional or alternative components. The hearing device 14 also preferably comprises a battery (not shown) and may also comprise an amplifier (not shown).

The memory 24 is adapted to store a decryption key therein. In a preferred embodiment, the memory 24 is a volatile memory. However, in alternate embodiments, any suitable type of memory could be used. The receiver 22 is adapted to receive a wireless transmission from the key FOB 16. In a preferred embodiment, the receiver 22 is a radio frequency receiver. However, in alternate embodiments, any suitable type of receiver could be used. In another alternate embodiment, the hearing device 14 might not comprise a wireless receiver. Instead, the hearing device 14 could be physically connected to the computer 12 by an electrical cord, such as when the hearing device 14 is similar to a stereo headset. In the embodiment shown, the memory 24 and receiver 22 are operably connected to a processor 20. In a preferred embodiment, the processor 20 comprises a microprocessor. The microphone 26 and the speaker 28 are also connected to the processor 20.

The processor 20 is adapted to store a decryption key, received by the receiver 22, into the memory 24. The processor 20 is also adapted to apply the decryption key stored in the memory 24 to audio signals received from the microphone 26. The audio signals comprise signals generated by the microphone 26 of the sound 30 broadcast by the speaker 18. When the decryption key stored in the memory 24 matches an encryption code of the audio signals from the microphone 26, the processor 20 is adapted to decrypt the encrypted audio signals and transmit the decrypted audio signals to the speaker 28. Because the speaker 28 is located in or adjacent a user's ear, the volume of the speaker 28 can be relatively low such that the sound emanating from the speaker 28 is not over heard by a nearby person.

In a preferred embodiment, the processor 20 is adapted to periodically delete the decryption key stored in the memory 24. The processor 20 is also adapted to periodically search for a new decryption key from the receiver 22. In an alternate embodiment, the processor 20 could use any suitable type of means or system for deleting a decryption key stored in the memory 24 upon a predetermined event and/or obtain a new decryption key for storage into the memory 24.

Referring also to FIG. 3, a block diagram of components of the key FOB 16 are shown. The key FOB 16 is preferably sized and shaped to be carried on or by a user, such as on a key chain, a necklace, or on an identity badge. However, any suitable type of key FOB could be provided and, the key FOB could be included in any other suitable type of device adapted to be carried or worn by a user.

In the embodiment shown, the key FOB 16 generally comprises a transmitter 32, a battery 34, a switch or sensor 36, a memory 38, and an input device 40. In an alternate embodiment, the key FOB 16 could comprise additional or alternative components. The memory 38 is adapted to store the decryption key therein. In a preferred embodiment, the memory 38 is programmable. However, in an alternate embodiment, the memory 38 might be fixed. In one type of embodiment, the memory 38 is adapted to store a decryption key seed. In this type of embodiment, the transmitter 32 can comprise a processor 42 for selecting a decryption key from the decryption key seed. Control of the selecting process can be based upon programming in the processor 42, or alternatively, can be controlled by an exterior controller, such as the computer 12. However, in an alternate embodiment, the key FOB 16 could be adapted to store only one decryption key at a time.

In the embodiment shown, the input device 40 is adapted to input the decryption key into the memory 38 from an exterior source. In an alternate embodiment, the input device 40 might not be provided. The exterior source could comprise the computer 12, an Internet connection, a dedicated decryption key input terminal, or an e-mail transmission. The input device 40 could comprise any suitable type of signal transmission device such as an electrical connector, an optical connector, an induction connector, a radio frequency receiver, or a manual input device (such as a keypad device). The input device 40 could be removably connected to the key FOB 16. The input device 40 is shown directly connected to the memory 38. However, the input device 40 could be connected to the memory 38 via the processor 42.

The transmitter 32 preferably comprises a radio frequency transmitter. However, in alternate embodiments, any suitable type of transmitter could be provided, such as an optical transmitter; the receiver 22 being matched to the transmitter, such as an optical receiver. In another alternate embodiment, the transmitter 32 could comprise a transducer. The transmitter 32 is adapted to transmit a decryption key stored in the memory 38. In a preferred embodiment, the transmitter 32 is a low-power transmitter. The transmitter 32 is adapted to broadcast the decryption key signal 44 on a frequency which can be received by the receiver 22 in the hearing device 14. Because the transmitter 32 is preferably a low-power transmitter, the key FOB 16 must be located relatively close to the hearing device 14 in order for the signal transmitted from the transmitter 32 to be operably received by the receiver 22.

In the embodiment shown, the switch 36 is preferably a biometric sensor. In a preferred embodiment, the biometric sensor 36 comprises a fingerprint detection device. However, in alternate embodiments, any suitable type of biometric sensor could be provided. In another type of alternate embodiment, the switch 36 could comprise any suitable type of locking/unlocking device, such as a keypad. In another alternate embodiment, the switch 36 might not comprise a locking/unlocking device, but instead could merely comprise a user actuated switch. An additional or alternative security system could be incorporated into the hearing device 14 or the computer 12.

The present invention can utilize a standard hearing device, such as a headphone set or hearing aid type device, that is modified to decrypt certain encrypted audio emanating from a computer system or other audio system. The decryption key necessary for decryption of the audio sound is preferably stored in the small key FOB carried by the user and activated by a biometric fingerprint detector built into the key FOB. Thus, if the FOB is lost, no one can use it to decrypt encrypted analog or digital data. When the user enables the decoder on the FOB, the FOB activates the hearing device by uploading a temporary decryption key.

This temporary decryption key is preferably stored in a volatile memory in the hearing device so it can be changed frequently and not discovered. The FOB preferably periodically changes the encryption key and transmits the new key to the hearing device. The circuit inside the FOB is preferably built as a self-destructive circuit which destroys itself if anyone tries to disassemble the FOB. The decryption key seed can be changed periodically via e-mail, the Internet, or a wired or wireless connection. If security is compromised, the user can be sent a new key seed which generates a new sequence of private keys in the FOB.

The present invention can be used with software that provides the ability to program documents or fields within a document with a digital encryption key such that an unauthorized recipient or bystander cannot easily decipher the material. A similar encryption technique is widely used today known as a Public Key Encryption or PKI. A PKI requires two keys; a public key and a private key. The public key is shared. However, the private key must be held by each recipient. The recipient must have the private key to unlock the document or encrypted fields in the document.

With the present invention, the private key can be kept in the key FOB carried by the user while the public key is stored on the user's computer system. The security electronics in the computer can recognize the private digital key codes from the key FOB and employ the codes to properly display the document on the computer system and/or broadcast the encoded information from the speaker. If the security electronics is not properly unlocked, the encrypted information can be displayed as gibberish, or the encrypted fields can be displayed as jumbled text or numbers. In a preferred embodiment, the data cannot be read from the computer system by locating the encrypted file because the data can be decrypted only when viewing it. In other words, the security system is related to the display electronics. The data can only be decrypted by the key in the FOB. Thus, the information can be encrypted with a code that can only be used by a particular recipient or group of recipients having the proper private key. Without the correct FOB, private key, and fingerprint, the document cannot be deciphered. In an alternate embodiment, the transmission of the encrypted audio information might not be related to display of information on the display.

Applications that wish to encrypt the audio data can invoke a function supplied by the present invention to process an audio clip and encrypt it for later use. For example, a document or file can be created having a field which is intended to be secured with the present invention. When information is stored in this field, the information is stored as an encrypted audio clip. If the audio clip is played, the computer system broadcasts the encrypted audio clip and/or can read the encrypted file and decrypt it for display of information on the display of the computer 12 if the user has proper access. Using this method, confidential speeches, audio presentations, or instructional materials can be sent or made downloadable to anyone, and the encrypted audio information can only be used by a user that possesses the proper key.

In the present invention, the user preferably carries a special key FOB that holds the users private key information. When the user approaches a computer system with the present invention installed on it, the user might wish to listen to an audio presentation, audio clip, or instructional material using a computer system. When the user approaches the computer system or comes in close proximity of the computer system, the user's private key data can be read from the key FOB and used to decrypt the audio data that is being broadcast or that will be broadcast to the hearing devices that are connected to the user's computer by a direct connection or wireless link. The audio data is otherwise obscured during the dual key algorithm. Together, the private key and the public key provide the decryption key that unscrambles the data for listening.

To prevent unauthorized users from copying the data to another system and reading it there, the audio data is preferably encrypted in the data file. The application that creates the file containing the audio data can allow the user to identify which fields or groups of audio are to be obscured. The application program can invoke a function supplied by the current invention to encrypt the data. Once the data is encrypted, it cannot be viewed or heard electronically without the user's private key.

For maximum privacy, the present invention can be deployed using a set of hearing headphones or hearing aids that contain the ability to decrypt the audio data. In the case of a wireless hearing device, the audio data is preferably transmitted to this device through a low-power wireless link to the hearing device.

Figure 4:
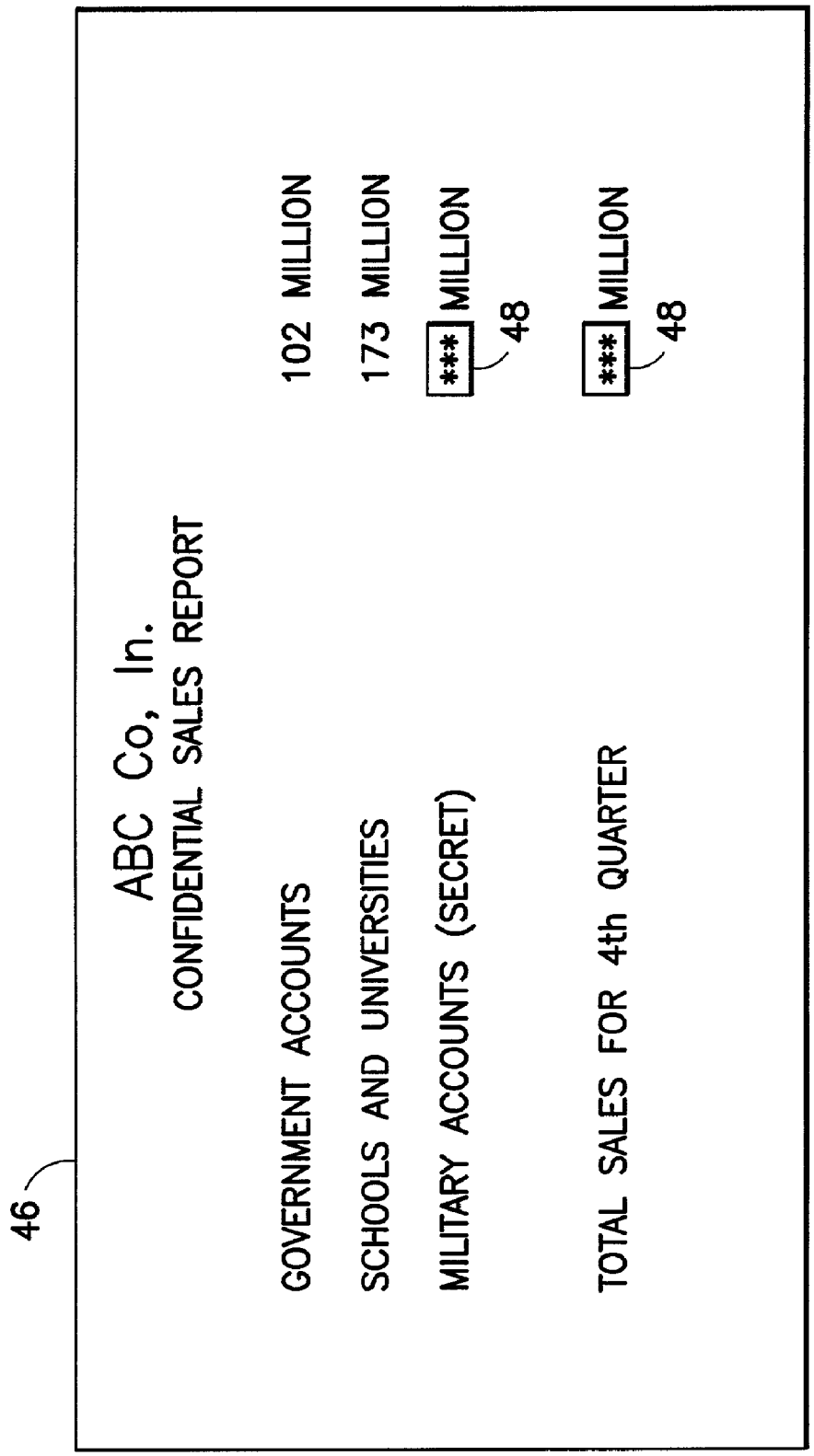
FIG. 4 is a diagram of one type of display screen on a display of the computer shown in FIG. 1.

Referring also to FIG. 4, a display screen showing an example of one type of display on a display 46 of the computer 12 is shown. The computer 12 is adapted to display information on the display 46 which comprises encrypted information and non-encrypted information. The encrypted information 48 is not displayed on the display 46. The encrypted information 48 can be transmitted or broadcast by the speaker 18 as an encrypted audio sound.

The encrypted audio sound containing the encrypted information 48 can be received by the hearing device 14. If the key FOB 16 has been activated to transmit the proper decryption code to the hearing device 14, the encrypted audio sound can be decrypted by the hearing device 14 and the information can be heard by the user. However, nearby people cannot see the encrypted information on the display 46 and cannot comprehensively hear the information in a decrypted form. Only the user having the hearing device 14 can hear the information in a decrypted form. Thus, the document containing the information shown in FIG. 4 can be made available with use of the public key, but the private key is necessary in order for the user to receive the information in fields 48 by an audio transmission.

The information in fields 48 is not displayed on the display 46 at any time. In an alternate embodiment, the key FOB 16 and the computer 12 could comprise means for displaying the information in the fields 48 on the display 46 when the computer senses the key FOB 16 with a proper decryption key.

This embodiment illustrates that portions of information or data can be encrypted while other portions of the information might not be encrypted. Of course, the information or data could be entirely encrypted as an audio transmission. Not all the information on the display needs to be broadcast by the speaker 18. Only the encrypted information might be broadcast by the speaker 18. The information or data intended to be secured can be stored in the computer 12 or transmitted to the computer in an encrypted form. In an alternate embodiment, the information or data intended to be secured can be stored in the computer 12 in an unencrypted form, and subsequently encrypted prior to broadcast from the speaker 18.

Figure 5:
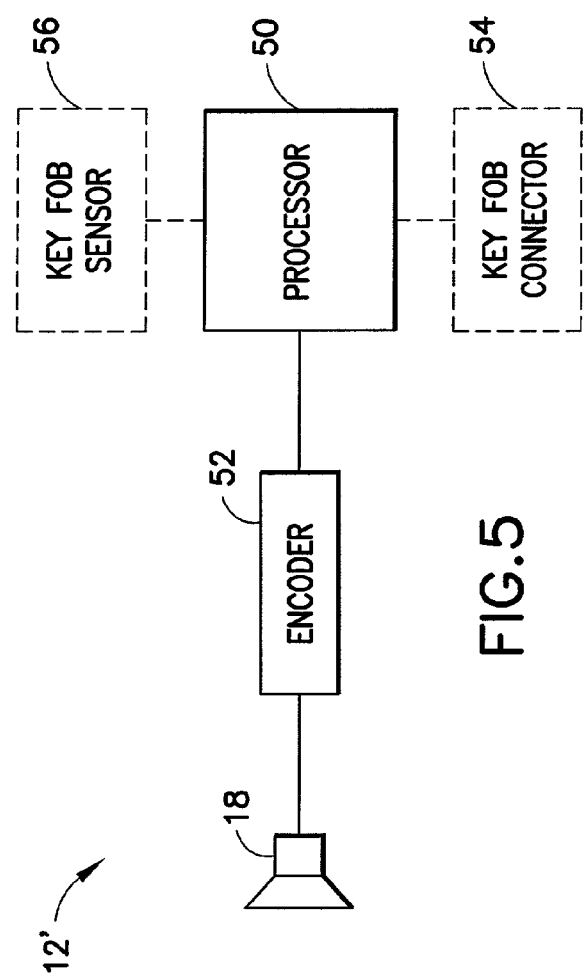
FIG. 5 is a schematic diagram of an alternate embodiment of the computer shown in FIG. 1.

Referring also to FIG. 5, an alternate embodiment of some of the components of the computer 12' is shown. In this embodiment, the computer comprises a processor 50 which is connected to the speaker 18 by an encoder 52. The encoder 52 is adapted to encrypt a signal from the processor 50 before the signal is broadcast by the speaker 18. In an alternate embodiment, the computer 12' can comprise a key FOB connector 54 which is connected to the processor 50. The connector 54 is adapted to connect to the key FOB 16 to allow encryption and decryption information to be exchanged between the computer 12' and the key FOB 16. In an alternate embodiment, any suitable type of means for synchronizing the encryption and decryption code between the computer and the key FOB could be provided.

Figure 6:
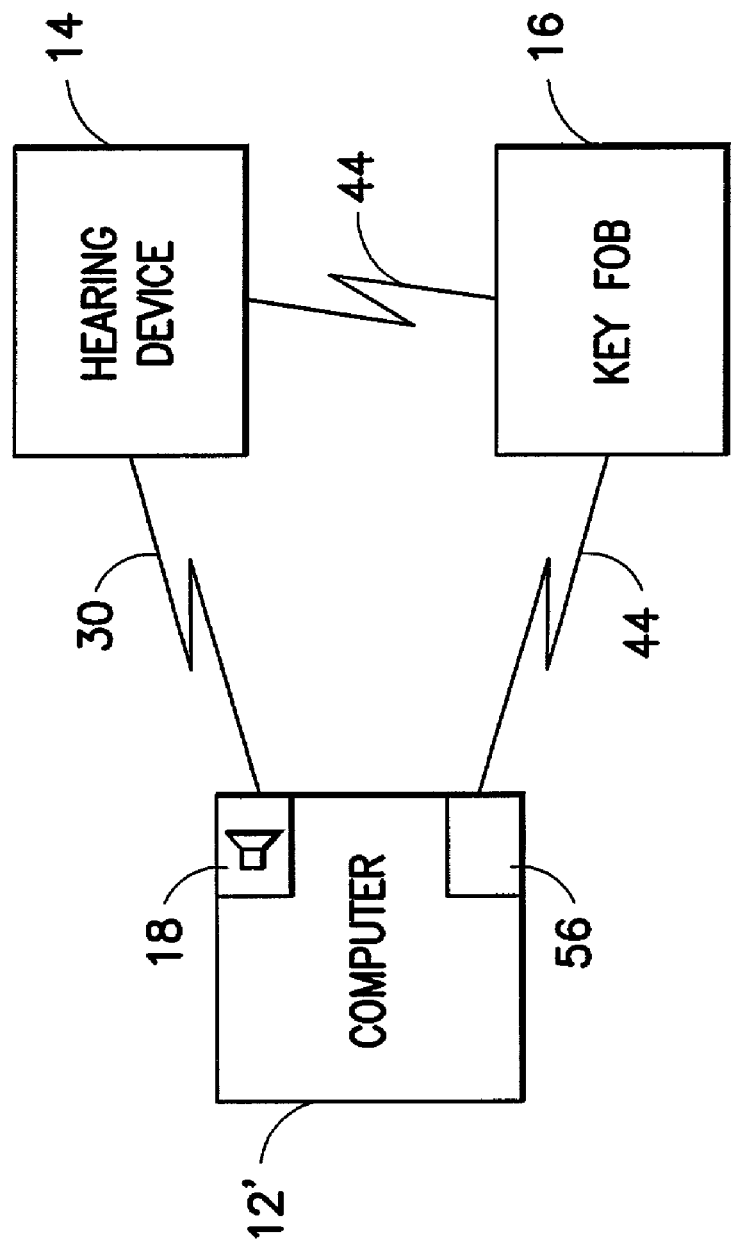
FIG. 6 is a block diagram showing an alternate embodiment of the system shown in FIG. 1.

Referring also to FIG. 6, in another alternate embodiment the computer 12' could comprise a key FOB sensor 56. The sensor 56, similar to the hearing device 14, could be adapted to receive the decryption key from the transmission 44 from the key FOB 16. The computer 12' could then synchronize the encryption of the information with the decryption key transmitted by the key FOB 16. In an alternate embodiment, the computer 12' could use the decryption key information from the transmission 44 as a security code before allowing secure information to be broadcast by the speaker 18 in an encrypted or decrypted form.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An encrypted audio decryption system for decrypting encrypted audio sound, the system comprising:
    a hearing device adapted to receive the encrypted audio sound, decrypt the encrypted audio sound, and transmit signals corresponding to the decrypted audio sound to an acoustic transducer of the hearing device; and
    a key FOB adapted to transmit a decryption key to the hearing device,
    wherein the hearing device is adapted not to decrypt the encrypted audio sound without receipt of the decryption key, corresponding to the encrypted audio sound, from the key FOB.

2. An encrypted audio decryption system as in claim 1 wherein the hearing device comprises a memory having the decryption key stored therein when the key FOB transmits the decryption key to the hearing device.

3. An encrypted audio decryption system as in claim 2 wherein the hearing device comprises means to delete the decryption key stored in the memory after a predetermined period of time.

4. An encrypted audio decryption system as in claim 2 wherein the hearing device comprises a wireless receiver for receiving a wireless signal comprising the decryption key from the key FOB.

5. An encrypted audio decryption system as in claim 1 wherein the key FOB comprises a wireless transmitter for transmitting the decryption key to the hearing device.

6. An encrypted audio decryption system as in claim 5 wherein the key FOB comprises a biometric sensor.

7. An encrypted audio decryption system as in claim 6 wherein the biometric sensor comprises a fingerprint sensor.

8. An encrypted audio decryption system as in claim 5 wherein the key FOB comprises means for transmitting a plurality of different decryption keys, and means for periodically changing the decryption key transmitted to the hearing device.

9. An audio hearing device comprising:
    a microphone;
    a system for decrypting encrypted audio sounds received at the microphone; and
    an acoustic transducer adapted to be placed at a user's ear, the acoustic transducer being connected to the decrypting system for transmitting decrypting audio sounds from the acoustic transducer to a user's ear,
    wherein the decrypting system comprises a memory and a system for receiving and temporarily storing a decryption key in the memory, and wherein the decrypting system requires a predetermined decryption key in the memory in order for the decrypting system to decrypt the encrypted audio sounds.

10. An audio hearing device as in claim 9 wherein the memory is volatile.

11. An audio hearing device as in claim 10 wherein the system for decrypting encrypted audio sounds comprises a wireless receiver for receiving a signal having the decryption key.

12. A method for decrypting encrypted audio sounds comprising steps of:
    receiving the encrypted audio sounds at a hearing device having an acoustic transducer at an ear of a user;
    receiving a decryption key by the hearing device; and
    decrypting the encrypted audio sounds by the hearing device if the decryption key matches a predetermined decryption key for the encrypted audio sounds.

13. A method as in claim 12 wherein the step of receiving a decryption key comprises transmitting the decryption key from a key FOB carried by the user.

14. A method as in claim 13 wherein the step of transmitting the decryption key comprises the user actuating a biometric sensor on the key FOB.

15. A method as in claim 12 further comprising storing the decryption key in a memory of the hearing device.

16. A method as in claim 15 further comprising deleting the decryption key stored in the memory upon a predetermined event.

17. A method as in claim 16 wherein the step of the deleting the decryption key from the memory occurs periodically.

\* \* \* \* \*